Nov. 26, 1957     A. WALDORF ET AL     2,814,199
AERIAL PATHFINDER DEVICE

Filed May 15, 1952     5 Sheets-Sheet 1

Inventors
ADRIAN WALDORF
WILLARD H. WADE

By

Attorney

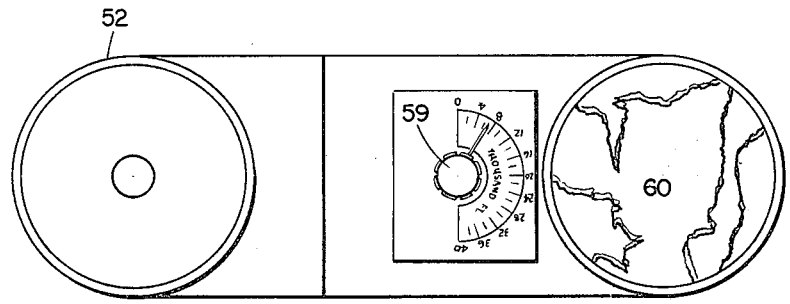
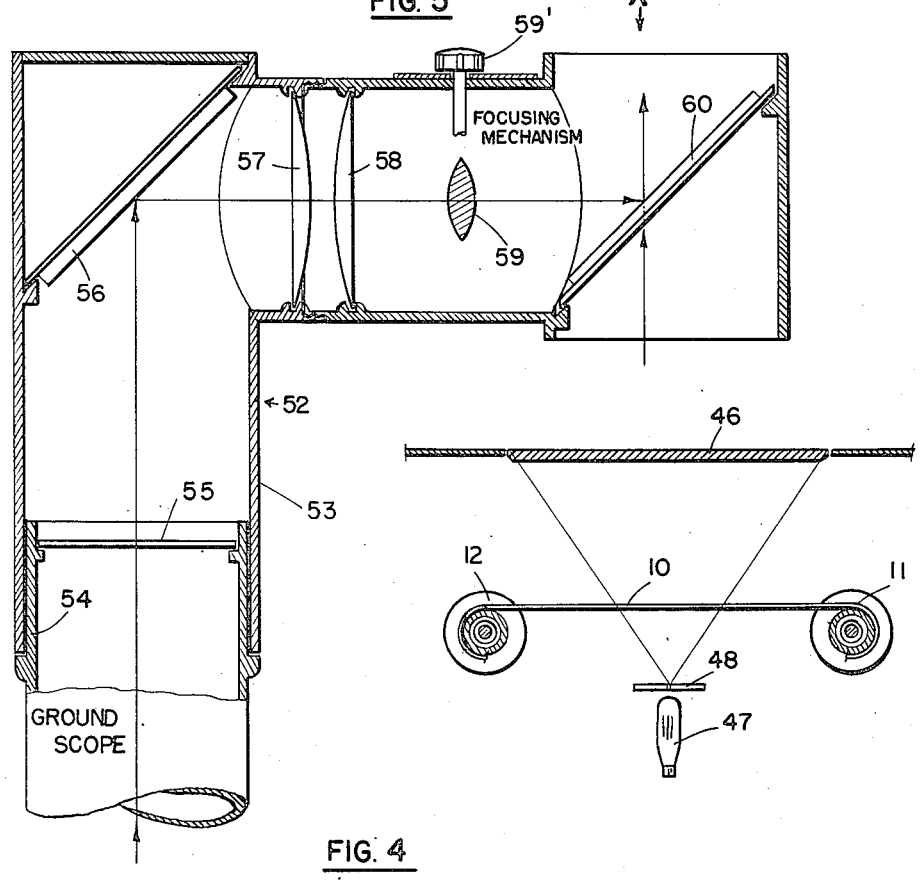

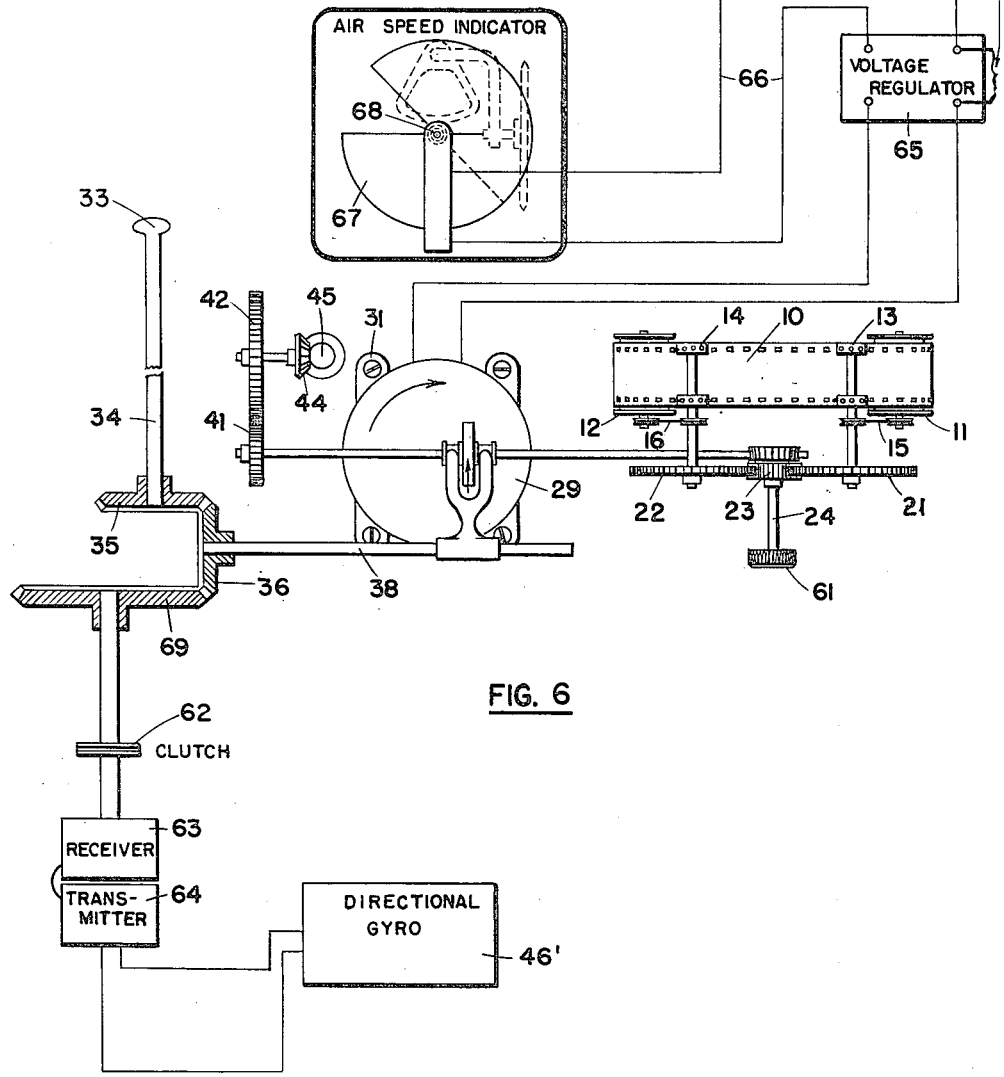

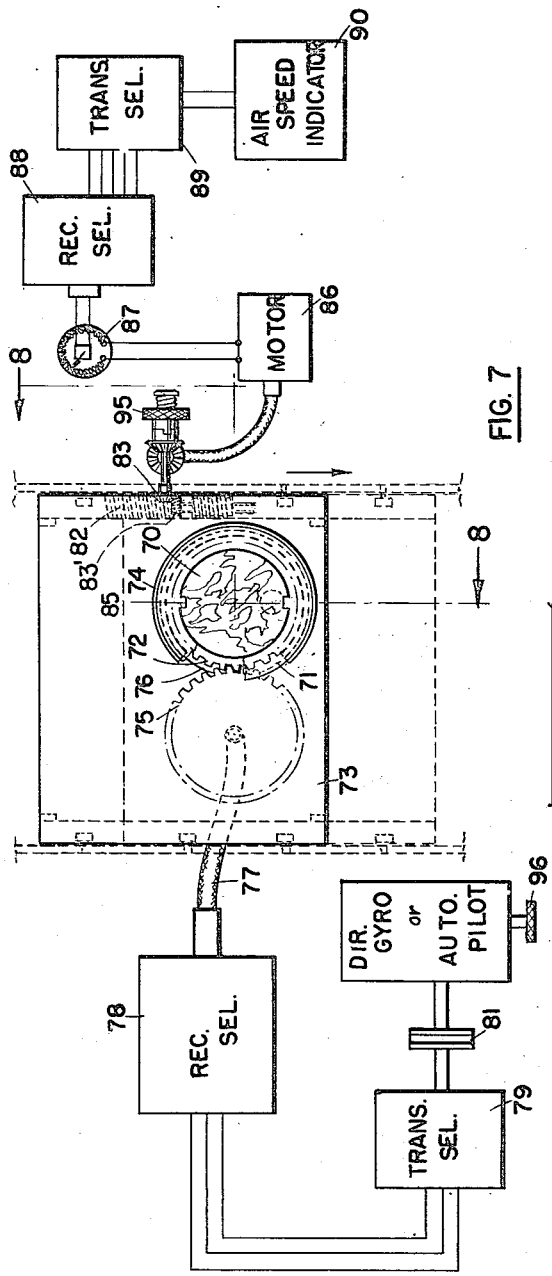
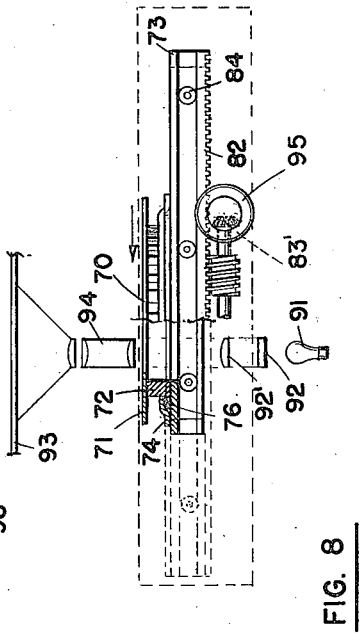
FIG. 7
FIG. 8
Inventor
ADRIAN WALDORF
WILLARD H. WADE

United States Patent Office 2,814,199
Patented Nov. 26, 1957

2,814,199

AERIAL PATHFINDER DEVICE

Adrian Waldorf, Port Washington, and Willard H. Wade, Syracuse, N. Y.

Application May 15, 1952, Serial No. 288,066

11 Claims. (Cl. 73—178)

(Granted under Title 35, U. S. Code (1952), sec. 266)

The invention described herein may be manufactured and used by or for the Government of the United States of America for governmental purposes without the payment of any royalties thereon or therefor.

This invention comprises a pathfinder and is intended for use in navigation. While the invention will be described in relation to its use with aircraft, it is understood that the device can be employed in ships, tanks and other means equally well, where travel along a predetermined course is desired.

Previously, the navigator had no accurate means for instantly knowing whether he was proceeding along the plotted course. This was especially true for aircraft, where the usual practice was to look at the ground below and compare it with a map held by the pilot, or to fly by compass. Or, during war time, ships required to travel a specifically narrow path would deviate from the plotted course, to be damaged or sunk. But with the use of the aerial pathfinder of the invention, these difficulties are avoided, with a true path being readily maintained.

It makes use of the fact that the radar equipment on present aircraft gives a presentation on the radar scope, that is, in effect, an image of the physical characteristics of the terrain over which the aircraft is flying. Thus, when a given course has been plotted over territory for which accurate maps are available, a special map of the proposed course may be prepared and the actual image of the terrain is matched with the features shown on the map as the course is flown.

In the form of the invention herein disclosed, the features of the special terrain map are matched to those of the actual terrain over which the aircraft is flying by optically superimposing the image from the radar scope on a projected image from the map, so that the pilot may control his course in such a manner that the two images coincide. When this is done, he will be on the exact plotted course for which the map has been prepared.

It should be recognized, however, that while the form of the invention shown discloses the matching of the map and the actual terrain by means of the radar scope, that the invention is sufficiently broad to cover any means for progressively matching a map against the territory being flown over. For example, the film may project an image superimposed on an optical image of the landscape.

A general object of the invention therefore is to provide a recorded means in comparative relation with an actual representation of said means whereby a correct course of travel is maintained.

Another general object of the invention is to enable a vehicle to travel in any predetermined direction without the necessity for maintaining a constant speed.

Yet another general object of the invention is to provide image stabilization and fixed line of sight orientation and to thereby eliminate incorporation of lenses ordinarily required to provide optical rotation of the film image.

A more specific object is to provide a means for moving a strip map of a predetermined course at a controlled speed proportional to the ground speed component along said course, whereby the setting of the speed control when adjusted to the progress of the craft along the course will indicate the true ground speed along the course, and at the same time the pilot is enabled to steer his craft on course by matching the actual terrain over which he is flying with the view on the map.

Another object is to use a film type of strip map and project the portion presented to view on a screen, whereby a comparatively large view may be obtained from a compact mechanism using a small film rolled up on small reels but covering a comparatively long course.

Another object is to connect the film drive shaft with a tachometer type of instrument in such manner as to indicate the true ground speed along the course, by proper calibrations when the shaft speed is adjusted to move the film in accordance with the actual movement of the craft over the course on the ground.

A further object is to provide an image of the terrain under the craft and superimpose it over the image projected from the map, and to use adjustable calibrated telescopic means for varying the size of the first image to match it in size with the map image, whereby the adjustment will automatically indicate the true altitude of the craft.

A further object is to use radar for providing the image of the ground terrain for superimposition on the map image, whereby the course may be readily followed under any conditions, whether the ground is visible or not.

A further object is to coordinate the control of the friction or any other speed changing mechanism in the above device with a directional gyro so as to automatically correct the speed of the map movement for the change in the component of the speed of travel in the direction of the prescribed course due to any accidental deviation of the aircraft from the prescribed course.

A further object is to incorporate in the above combination a control of the motor speed in accordance with an air speed indicator on the aircraft indicating the true air speed, so as to automatically correct the speed of movement of the map to correspond with the change in the air speed of the aircraft.

A further object is to provide means for moving the map in any direction in accordance with any change in direction of flight so as to maintain a matching relation between the projected images from the ground and from the map even if the course deviates from a straight line.

And a further object of the invention resides in providing a compact and relatively light device, economically constructed by the elimination of expensive and specially designed parts.

Other objects and many of the attendant advantages of this invention will be readily appreciated as the same becomes better understood by reference to the following detailed description when considered in connection with the accompanying drawings wherein:

Fig. 4 is a central sectional view of the matching head by which the images from the special course may and from the ground scope of the radar equipment are superposed in matching relationship.

Fig. 5 is a plan view of the matching head, and

Fig. 6 is a diagrammatic view of mechanisms for automatically correcting the speed of the map drive for any change in the heading of the craft and in its air speed.

Figs. 7 and 8 are diagrammatic illustrations of a modification of the present device wherein a film plate for the map is used instead of the strip film from which to project the map on the screen.

Figure 1:
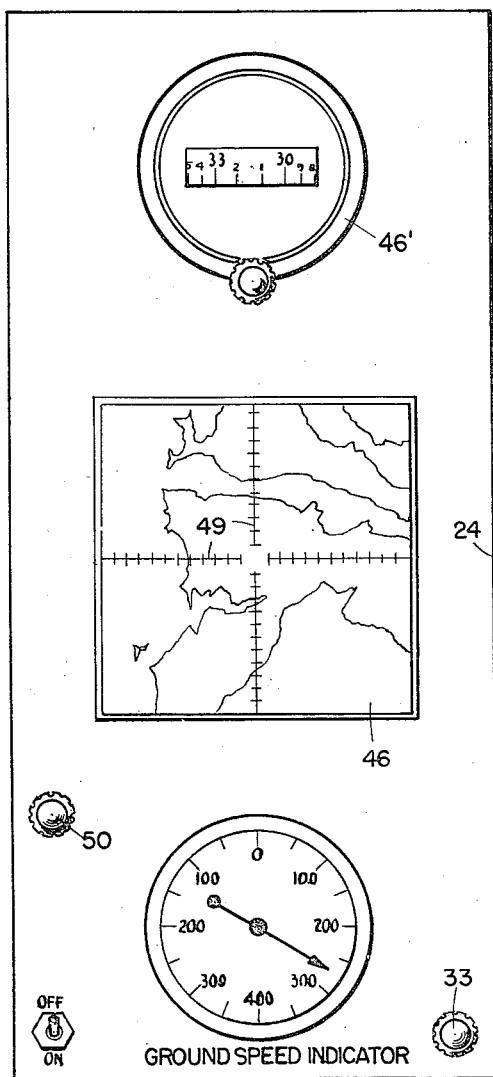
Fig. 1 shows an exterior view of the cabinet in which the map projector is contained.
Figure 2:
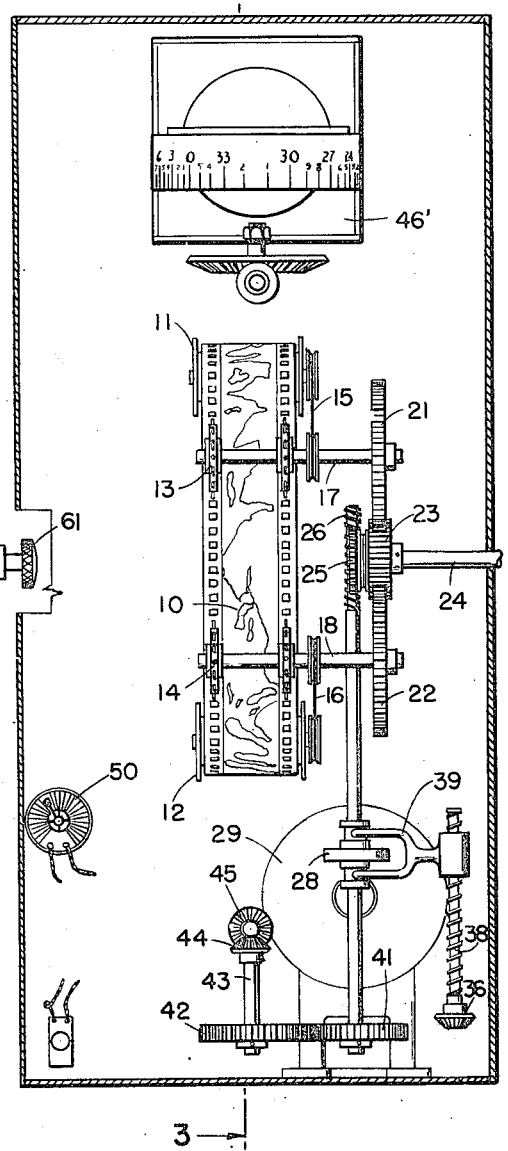
Fig. 2 shows the internal mechanism within the cabinet with some elements not shown.
Figure 3:
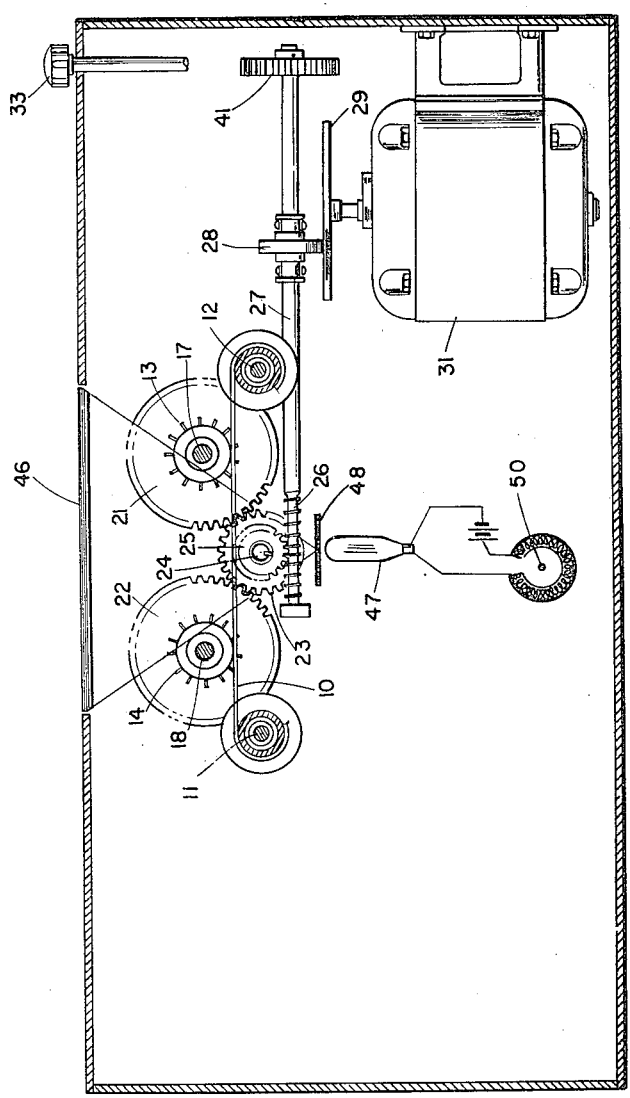
Fig. 3 is a central sectional view taken on the section line 3—3 of Fig. 2 with some parts eliminated for clarity.

The special course map illustrated preferably consists of a strip of 35 mm. film 10 on which a reduced scale strip map of the course to be flown is reproduced. The film 10 extends between a pair of reels 11 and 12 and can be driven in either direction by the pairs of sprocket drive wheels 13 and 14. The reels 11 and 12 are driven by means of friction belts 15 and 16 which extend between the reel mounting shafts and the shafts 17 and 18 of the sprockets 13 and 14 respectively. The arrangement is such that the drive through the friction belts 15 and 16 can slip. Thus while these belts will serve to take up the film on the reels 11 and 12, positive control of the film position is exerted by the sprockets 13 and 14.

The shafts 17 and 18 of the sprockets 13 and 14 are driven by a pair of spur gears 21 and 22, each of which meshes with a common driving gear 23 mounted on the shaft 24 and driven by the worm gear 25 and worm 26. The worm 26 is positioned at the end of the shaft 27 and is driven at a variable speed by means of the driven friction wheel 28, keyed to the shaft 27 and arranged to move to any desired position of adjustment on the driving disc 29. Since the driving disc 29 is driven at a constant speed by the motor 31 the speed of the movement of the film may be varied from zero to a maximum in either direction by moving the driven disc 28 to the exact center of the disc 29 or in either direction from the center to the outer edge of the driving disc.

The position of the driven friction wheel 28 with respect to the disc 29 may be manually adjusted by the speed control knob 33 on the outside of the cabinet. This knob operates through the shaft 34 and the bevel gears 35 and 36 to rotate the screw threaded rod 38 and move the internally threaded yoke 39 along the shaft. The yoke 39 engages a pair of grooves on the hub of the driven friction wheel 28 and thus controls the position of the wheel.

From the foregoing, it will be seen that by adjustment of the speed control knob 33 the friction wheel 28 may be moved to any predetermined position, so that the map on the film 10 will be advanced at a speed proportional to the speed maintained by the aircraft.

The image on the course may 10 is projected onto a translucent screen 46 on the front panel of the cabinet by any suitable projecting means, such as the projection lamp 47 and point orifice in the plate 48. The screen or translucent plate 46 is preferably provided with etched markings 49 so that distances may be accurately estimated. A rheostat 50 is included in the circuit of the projection lamp 47 so that the intensity of the image on the screen 46 may be varied to any desired value, to match the image appearing on the radar scope.

The two images are superposed on each other in matching relationship by the matching head 52. As illustrated in Fig. 4, the matching head 52 includes a sleeve mounting portion 53 to be fitted over the cylindrical housing 54 of the radar ground scope. The radar image on the presentation screen 55 of the ground scope is reflected through the mirror 56, the lenses 57 and 58 and through a focusing arrangement including the lens 59 to a half-silvered mirror 60. Thus the image on the ground scope screen 55 can be viewed from the point "X," and, since the screen 46 is also visible through the transparent half-silvered mirror 60, the two images will be superposed on each other in matching relationship. Lens 59 is adjusted by means of knob 59'.

In the operation of the device the pilot will observe the images from the point "X" and as long as both images are in exact registry, he will know that the plane is on its true course. In the event that the two images move out of registry in lateral relationship, he will be warned that the aircraft is off its course and can make appropriate corrections. If it is observed that the two images are out of registry in a longitudinal direction, that is, the direction of movement of the film, it indicates that the film feed is not exactly proportional to the true speed of the aircraft. This may be corrected by adjustment of the feed control knob 33 and the two images may be brought into registry by trimming with the declutching knob 61. This provides an arbitrary means for disengaging the drive to the film from the motor or tachometer drive and is also used to effect the original matching at the beginning of each flight.

Fig. 6 shows one form of mechanisms that may be used for automatically correcting the speed of movement of the map in accordance with the indication of deviation of the actual course of the aircraft from the intended course as indicated by the directional gyro, and in accordance with any change in air speed of the aircraft as indicated by the air speed indicator.

In addition to using the manual control knob for adjusting the speed of advancement of the map in accordance with the speed of the aircraft by observing the comparative movements of the image and the map as explained above, an automatic control may be used connected to the rod 38 in the same way as the gear 35 of the control knob, and actuated automatically through a friction clutch 62 and gear 69 by a selsyn control connected to the directional gyro, so as to operate automatically in accordance with the change in the indications of the gyro, which has been previously set on the intended course for no correction. The selsyn receiver 63 and transmitter 64 are indicated in Fig. 6 by block diagrams. The gear 69 is so selected that a 90° turn of the gyro indicator from the prescribed course will move the friction wheel 28 to the center of the disc 29 for zero advancement of the map, and will therefore reverse the movement of the map for angles greater than 90° off course.

Another automatic control may further be added for correcting the speed of movement of the map for any change in air speed of the aircraft by controlling the speed of the motor 31 through a voltage regulator 65 in accordance with the indications on an air speed indicator, the needle shaft 68 of which is connected to a movable condenser plate 67 for changing the capacity in the voltage regulator circuit.

Fig. 6 shows the voltage regulator in block diagram with electrical connections 66 to the condenser, the movable plate 67 of which is connected to the air speed indicator needle at its pivot 68.

The shaft 27 driving the map film is connected through the spur gears 41 and 42 and bevel gears 44 and 45 to a shaft of an instrument of the tachometer type, calibrated to indicate the ground speed when the plane is flying on course and its speed is matched with the speed of drive of the map film. The ground speed may be indicated by a direct connection between the yoke 39 and a scale indicator showing the axial position of the yoke along its control screw 38.

While the device has been described by reference to certain specific elements, it is obvious that minor variations may be made without deviating from the scope of the invention. Thus, the projection method may be from either a pinpoint source of light or by a lens system. As another example, a simple magnifying lens system could be provided, rather than the rear projection screen described.

In the modification shown in Figs. 7 and 8, the strip film and its feeding mechanism is replaced by the film plate 70 which is shown in circular form, although it may be square, oblong, or any other shape. This film plate is mounted in a frame 71 having a gear 72 integral therewith and is mounted for rotation in the frame 73. In the form shown, the gear 72 has a flange 76 slideably mounted in a circumferential guide 74 on the frame 73. A second gear 75 is also mounted in the frame 73 so as to mesh with gear 72. Gear 75 is connected by a flexible cable 77 with a selsyn 78 controlled by a transmitting selsyn 79 connected to the directional gyro 80 through a friction coupling 81 so that the selsyn may be set in any position with respect to the directional gyro. The frame 73 has a rack 82 to which the driving pinion 83 is operatively connected by means of coaction with driven pinion 83; rollers 84 are provided for guiding the frame 73 in its movement by this pinion. The film plate frame 71 is notched at 85 and the film plates are notched accordingly so as to fix them relative to the frame when in use. A series of film plates, each covering a predetermined territory of, for example, approximately 300-mile radius, may be provided to cover any section of the country over which the craft is to be flown. Obviously any other scale of maps might be used on the film plates.

The pinion 83 is driven by a motor 86, the speed of which is regulated by rheostat 87 which is controlled by receiving selsyn 88, connected with a transmitting selsyn 89, controlled in turn by the air speed indicator 90. In place of the pinpoint light projection used in the other modification for projecting the map image on the screen, in the present modification a lamp 91, heat filter 92, and lens 92' combination is used for making the projection of the map image from the film plate to the screen 93 through a focusing lens combination 94.

It will be observed that the speed of movement of frame 73 may be regulated in accordance with the air speed of the craft so that the map image will move at the same rate as the aircraft, thus keeping the map image and the ground image matched. Any change in direction of flight will be picked up by the directional gyro and transmitted through the selsyns 79 and 78 and the cable 77 and gear 75 to the gear 72 which is directly connected to the film plate and turns at the same amount in the proper direction to maintain the directional position of the film plate and therefore the map image on the screen in line with the directional position of the ground image. A control button 95 is provided for pushing the pinion 83 out of mesh with pinion 83' on the worm operating the rack 82 so that the frame 73 may be set quickly to any position at the start of a journey whereby the images may be matched. The pinion 83 is held in operative position by spring mechanism and may therefore be readily pushed out of mesh by the control button 95. Another control knob 96 is connected to the directional gyro for presetting purposes.

Obviously many modifications and variations of the present invention are possible in the light of the above teachings. It is therefore to be understood that within the scope of the appended claims the invention may be practiced otherwise than as specifically described.

What is claimed is:

1. A pathfinder device for aircraft comprising a map of the terrain over which the aircraft is to be flown, drive means for moving said map at a regulated speed and in a direction corresponding with the course followed, means for superimposing an image of the ground directly below over the corresponding portion of the said map, and automatic speed regulating means actuating said drive means for continually controlling the movement of said map in accordance with theg round speed of the aircraft along the course so as to continuously match the view on the map with the ground image, said automatic speed regulating means comprising a driving disc connected to said drive means, a directional gyro, and connecting means including a friction coupling between the driving disc and the directional gyro for automatically and continually controlling the movement of the map.

2. A pathfinder device for aircraft comprising a map of the terrain over which the aircraft is to be flown, drive means for moving said map at a regulated speed and in a direction corresponding with the course followed, means for superimposing an image of the ground directly below over the corresponding portion of said map, automatic speed regulating means actuating said drive means for continually controlling the movement of said map in accordance with the ground speed of the aircraft along the course so as to continuously match the view on the map with the ground image, said automatic speed regulating means comprising a driving disc connected to said drive means, a directional gyro, and connecting means including a friction coupling between the driving disc and the directional gyro for automatically and continually controlling the movement of the map, and manual declutching means in said drive means for setting the position of the map to coincide with the ground image.

3. A pathfinder device for aircraft comprising a map of the terrain over which the aircraft is to be flown, drive means for moving said map at a regulated speed and in a direction corresponding to the course followed, means for superimposing an image of the ground directly below the corresponding portion of said map, manual speed regulating means for controlling the movement of said map in accordance with the ground speed of the aircraft along the course so as to continuously match the view on the map with the ground image, said automatic speed regulating means comprising a driving disc connected to said drive means, a directional gyro, and connecting means including a friction coupling between the driving disc and the directional gyro for automatically and continually controlling the movement of the map, manual declutching means in said drive means for setting the position of the map to coincide wtih the ground image, automatic means actuating said drive means for varying the speed of movement of said map in accordance with any changes in the air speed of the aircraft, and additional automatic means for reducing the speed of movement of said map in accordance with any reduction in the ground speed component along the prescribed course caused by a deviation of the track of the airplane off the prescribed course, said additional automatic means comprising an air speed indicator, a driving disc connected to the map and a voltage regulator connecting said airspeed indicator and driving disc.

4. In a pathfinder device for aircraft a speed controlled motor with a friction drive disc, a strip map film of the course to be followed, a pair of reels between which said film is wound, a sprocket drive for said film having a friction slip overdrive for said reels, connections between said sprocket drive and said disc including a shaft normal to the axis of said disc with an axially adjustable roller splined thereto and frictionally driven off said disc, said connections also including a manually operated declutching coupling, manual adjusting means for said roller, means for projecting an image of the view shown on said film, and means for superimposing an image of the ground over which the aircraft is flying on the film image to enable the coordination of the two images by correcting the aircraft heading so as to follow the prescribed course on the film and by matching the speed of the film image with the ground speed of the aircraft along the prescribed course.

5. In a pathfinder device for aircraft a speed controlled motor with a friction drive disc, a strip map film of the course to be followed, a pair of reels between which said film is wound, a sprocket drive for said film having a friction slip overdrive for said reels, connections between said sprocket drive and said disc including a shaft normal to the axis of said disc with an axially adjustable roller splined thereto and frictionally driven off said disc, said connections also including a manually operated declutching coupling, manual adjusting means for said roller, means for projecting an image of the view shown on said film, means for superimposing an image of the ground over which the aircraft is flying on the film image to enable the coordination of the two images by correcting the aircraft heading so as to follow the prescribed course on the film and by matching the speed of the film image with the ground speed of the aircraft along the prescribed course, and automatic adjusting means for adjusting said roller in accordance with any changes in the aircraft heading so as to maintain the matching in the advancement of said images regardless of any accidental changes in the heading and temporary digression from the prescribed course.

6. In a pathfinder device for aircraft a speed controlled motor with a friction drive disc, a strip map film of the course to be followed, a pair of reels between which said film is wound, a sprocket drive for said film having a friction slip overdrive for said reels, connections between said sprocket drive and said disc including a shaft normal to the axis of said disc with an axially adjustable roller splined thereto and frictionally driven off said disc, said connections also including a manually operated declutching coupling, manual adjusting means for said roller, means for projecting an image of the view shown on said film, and means for superimposing an image of the ground over which the aircraft is flying on the film image to enable the coordination of the two images by correcting the aircraft heading so as to make it follow the prescribed course on the film and by matching the speed of the film image with the ground speed of the aircraft, automatic adjusting means for adjusting said roller in response to any change in the aircraft heading so as to maintain the matching in the advancement of said images regardless of any accidental changes in heading, and additional automatic adjusting means for varying the speed of the motor in response to changes in air speed.

7. In a pathfinder device for aircraft a speed controlled motor with a friction drive disc, a strip map film of the course to be followed, a pair of reels between which said film is wound, a sprocket drive for said film having a friction slip overdrive for said reels, connections between said sprocket drive and said disc including a shaft normal to the axis of said disc with an axially adjustable roller splined thereto and frictionally driven off said disc, said connections also including a manually operated declutching coupling, manual adjusting means for said roller, means for projecting an image of the view shown on said film, means for superimposing an image of the ground over which the aircraft is flying on the film image to enable the coordination of the two images by correcting the aircraft heading so as to make it follow the prescribed course on the film and by matching the speed of the film image with the ground speed of the aircraft, a gyro compass and connecting means including a friction coupling between the indicator in the gyro compass and the roller for adjusting the latter in accordance with any changes in the heading of the aircraft.

8. In a pathfinder device for aircraft a speed controlled motor with a friction drive disc, a strip map film of the course to be followed, a pair of reels between which said film is wound, a sprocket drive for said film having a friction slip overdrive for said reels, connections between said sprocket drive and said disc including a shaft normal to the axis of said disc with an axially adjustable roller splined thereto and frictionally driven off said disc, said connections also including a manually operated declutching coupling, manual adjusting means for said roller, means for projecting an image of the view shown on said film, means for superimposing an image of the ground over which the aircraft is flying on the film image to enable the coordination of the two images by correcting the aircraft heading so as to make it follow the prescribed course on the film and by matching the speed of the film image with the ground speed of the aircraft, a gyro compass and connecting means including a friction coupling between the indicator in the gyro compass and the roller for adjusting the latter in accordance with any changes in the heading of the aircraft, an air speed indicator, and an automatic adjusting means for varying the speed of the motor in response to changes in the indicator element of the air speed indicator.

9. In a pathfinder device for aircraft a speed controlled motor with a friction drive disc, a strip map film of the course to be followed, a pair of reels between which said film is wound, a sprocket drive for said film having a friction slip overdrive for said reels, connections between said sprocket drive and said disc including a shaft normal to the axis of said disc with an axially adjustable roller splined thereto and frictionally driven off said disc, said connections also including a manually operated declutching coupling, manual adjusting means for said roller, means for projecting an image of the view shown on said film, means for superimposing an image of the ground over which the aircraft is flying on the film image to enable the coordination of the two images by correcting the aircraft heading so as to make it follow the prescribed course on the film and by matching the speed of the film image with the ground speed of the aircraft, and focusing means for said superimposing means calibrated to indicate the altitude of the aircraft above the ground when the superimposed image is focused.

10. In a pathfinder device for aircraft a speed controlled motor with a friction drive disc, a strip map film of the course to be followed, a pair of reels between which said film is wound, a sprocket drive for said film having a friction slip overdrive for said reels, connections between said sprocket drive and said disc including a shaft normal to the axis of said disc with an axially adjustable roller splined thereto and frictionally driven off said disc, said connections also including a manually operated declutching coupling, manual adjusting means for said roller, means for projecting an image of the view shown on said film, means for superimposing an image of the ground over which the aircraft is flying on the film image, to enable the coordination of the two images by correcting the aircraft heading so as to make it follow the prescribed course on the film and by adjustment to match the speed of the film image with the ground speed of the aircraft, automatic adjusting means for adjusting said roller in accordance with any changes in the aircraft heading so as to maintain the matching in the advancement of said images regardless of any accidental changes in heading, additional automatic adjusting means for varying the speed of the motor in accordance with changes in air speed, and a tachometer device directly geared to said shaft and calibrated to indicate the ground speed of the aircraft when the speed of movement of the images is matched.

11. In a pathfinder device for aircraft a speed controlled motor with a friction drive disc, a strip map film of the course to be followed, a pair of reels between which said film is wound, a sprocket drive for said film having a friction slip overdrive for said reels, connections between said sprocket drive and said disc including a shaft normal to the axis of said disc with an axially adjustable roller splined thereto and frictionally driven off said disc, said connections also including a manually operated declutching coupling, and manual adjusting means for said roller.

References Cited in the file of this patent

UNITED STATES PATENTS

| | | |
|---|---|---|
| 2,526,682 | Mulberger et al. | Oct. 24, 1950 |
| 2,541,277 | Omberg et al. | Feb. 13, 1951 |
| 2,566,247 | Pierce et al. | Aug. 28, 1951 |
| 2,569,328 | Omberg | Sept. 25, 1951 |
| 2,608,094 | Best | Aug. 26, 1952 |